Patented June 29, 1926.

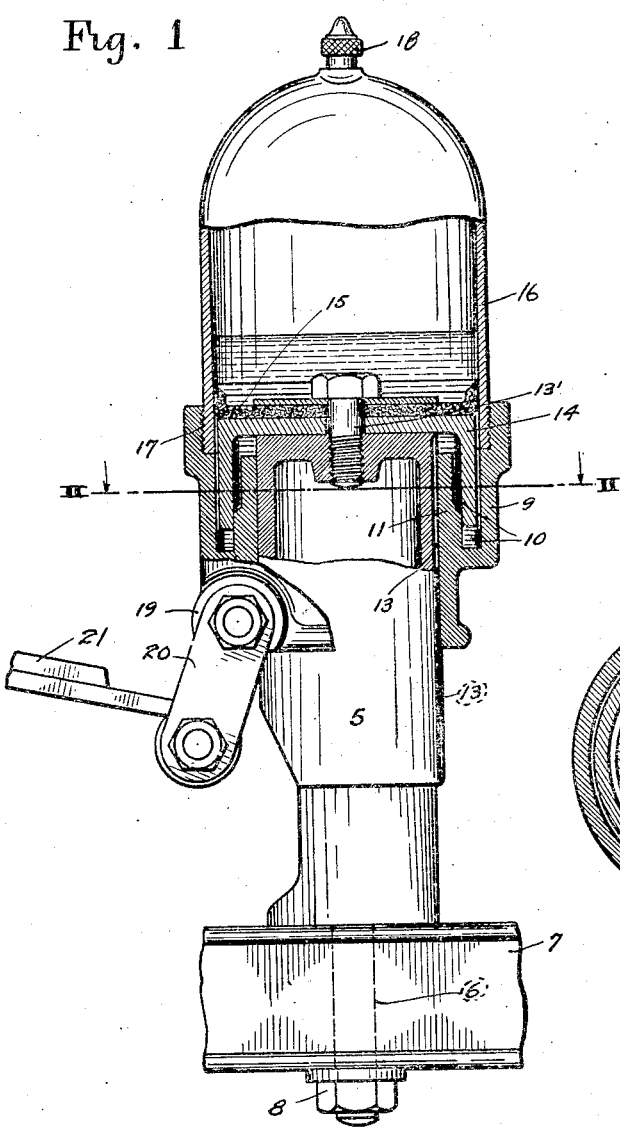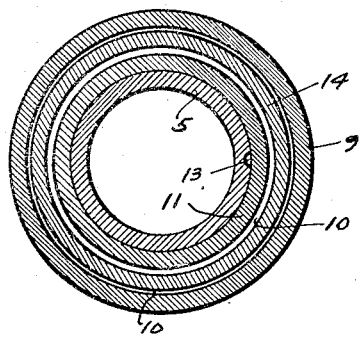

1,590,565

UNITED STATES PATENT OFFICE.

FRANK A. DOWLER, OF ALAMEDA, CALIFORNIA.

SHOCK ABSORBER.

Application filed April 28, 1924. Serial No. 709,547.

This invention relates to shock absorbers and more particularly to devices adapted for use in connection with automobiles and similar vehicles for absorbing and diminishing shocks, jars and vibrations incident to irregularities in the road surface over which the vehicle travels, and a primary object of the invention is to provide a device of this character which includes a novel form of oil seal for the joint between the relatively movable elements of the device and means for automatically maintaining said seal as said elements function, and for associating said seal with compressed air which I use as an effective shock absorbing agent, while providing means whereby maximum resiliency for both shock and recoil of the parts is obtained.

My invention is therefore directed to means for holding compressed air against leakage and for preventing the oil constituting the aforesaid seal from casual loss while the elements of the device are in operation.

The preferred form of my invention is illustrated in the accompanying drawing, in which Figure 1 is a view in side elevation of the device showing parts in section, and Figure 2 is a cross section taken on line 2—2 of Figure 1.

In carrying the invention into practice, use is made of a fixed cylindrical member (5) having a reduced stud or shank (6) at its lower end, the same being passed through the front axle (7) and bolted thereto at (8).

Telescoping the upper closed end of the member (5) so that the parts are free to slide relatively, is a cup or well member (9) having a well cavity (10) defined by spaced walls (11) and (12) of graduated lengths. The wall (11) snugly embraces the walls of the member (5) with ample clearance to permit the parts to function without loss of oil from the well cavity (11), and, as shown, said member (5) has formed in its periphery a longitudinal groove providing an air vent or orifice (13) which opens at one end to the outside atmosphere and at its opposite end to the well cavity (10). The purpose of this arrangement will be clearly set forth as the description goes forward.

Bolted at (13') to the upper closed end of the member (5) is an inverted cylindrical cup or piston head (14) whose side walls depend into the well cavity (10) between the walls (11) and (12) thereof. Also secured to the member (5) by means of the bolt (13') is a flexible piston washer (15) whose marginal edge is deflected against the inner walls of an air chamber (16). Oil is contained in this chamber at a point immediately above the washer (15) and this oil functions against the loss of compressed air from said chamber. The construction serves to permit the chamber (16) and said well member (9) to move in telescopic relation to the member (5) so that on the respective strokes of the piston, oil contained in the chamber (16) is free to circulate back and forth between the chamber and said well to afford proper displacement of the oil without loss thereof and without breaking the air seal above the piston member (15).

By telescoping the respective parts as above described, it follows that effective means are provided to maintain an oil sealed condition of compressed air contained in the chamber (16), and by providing the air vent (13), the sliding action of the parts is without restriction, and the parts are therefore made to respond instantly to the action of all shocks and jars imparted thereto. I have shown the lower end of the chamber (16) threaded at (17) to the upper end of the long wall (12) of the member (9). However, in this respect I reserve the right to modify this construction within the scope of the hereto appended claim.

The upper end of the chamber (16) is provided with an air inlet valve (18) by means of which air under the desired pressure may be conducted to said chamber to serve as a cushioning agent above the level of the oil which constitutes the aforesaid seal.

The member (9) is formed with a depending bracket arm (19) connected by a shackle (20) with the spring (21).

I am particularly interested in the manner of telescoping the aforesaid parts of the device so that a by-pass is formed between the oil space in the chamber (16) and the well cavity (10), whereby to maintain an oil sealed condition of compressed air in the chamber, and for this reason, do not confine myself to the structural details herein shown, nor do I wish to limit myself to the manner of interposing the device between the axle of the vehicle and the mating spring. These details may be varied to suit different requirements, as will be understood.

When the chamber 16 moves downward, some oil in the chamber (16) will be forced past the flexible washer 15 into the well cavity (10) by the compressed air in chamber 16 and returns again to said chamber on the upward stroke of said chamber due to the skirt of piston 14 telescoping in the oil well.

I claim:

A shock absorber comprising a cylindrical member having an integral reduced shank at its lower end adapted to be fixed to an axle of a vehicle, a cup telescoping the member and provided with a well cavity defined by spaced apart parallel walls, the member being formed at one side with a vent groove leading from the well to the external atmosphere, a piston head secured to the upper end of said member and having a depending flange extending into said well, means to permit a spring to be attached to said cup, a combined oil and air chamber threaded at its base to the upper end of the cup, and a cupped gasket secured to the head and to the upper end of said member.

FRANK A. DOWLER.